(12) United States Patent
Uchida et al.

(10) Patent No.: US 6,975,564 B2
(45) Date of Patent: *Dec. 13, 2005

(54) MAGNETO-OPTICAL RECORDING MEDIUM FOR USE IN DOMAIN WALL DISPLACEMENT DETECTION SYSTEM, AND METHOD FOR PRODUCING THE SAME

(75) Inventors: Kiyoshi Uchida, Kitakatsuragi-gun (JP); Yasumori Hino, Ikoma (JP); Motoyoshi Murakami, Hirakata (JP); Norio Miyatake, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/699,937

(22) Filed: Nov. 3, 2003

(65) Prior Publication Data

US 2004/0090875 A1 May 13, 2004

Related U.S. Application Data

(62) Division of application No. 10/038,189, filed on Oct. 24, 2001, now Pat. No. 6,767,697.

(30) Foreign Application Priority Data

| Oct. 31, 2000 | (JP) | ............................. 2000-332051 |
| Apr. 19, 2001 | (JP) | ............................. 2001-121238 |

(51) Int. Cl.$^7$ ............................................. G11B 11/00
(52) U.S. Cl. .................................. 369/13.03; 369/13.55
(58) Field of Search .......................... 369/13.35, 13.38, 369/13.39, 13.4; 428/64.3, 64.4, 694 ML, 428/156, 163, 167, 212, 336, 409

(56) References Cited

U.S. PATENT DOCUMENTS

| 5,459,701 A | * | 10/1995 | Tokita et al. ............ 369/13.24 |
| 5,684,762 A |   | 11/1997 | Kubo |
| 5,991,258 A |   | 11/1999 | Morita et al. |
| 6,027,825 A |   | 2/2000 | Shiratori et al. |
| 6,115,330 A |   | 9/2000 | Morimoto |
| 6,177,175 B1 |   | 1/2001 | Hashimoto |
| 6,254,966 B1 | * | 7/2001 | Kondo ....................... 428/156 |
| 6,343,052 B1 |   | 1/2002 | Hashimoto et al. |

(Continued)

FOREIGN PATENT DOCUMENTS

JP          6-290496          10/1994

(Continued)

*Primary Examiner*—Tan Dinh
(74) *Attorney, Agent, or Firm*—Hamre, Schumann, Mueller & Larson, P.C.

(57) ABSTRACT

An optical disk of the present invention includes a substrate and a recording layer disposed above the substrate, and reproduces an information signal by a DWDD system, using light incident from the substrate side. The optical disk further includes a first dielectric layer disposed between the substrate and the recording layer and a second dielectric layer disposed on the recording layer opposite to the substrate, wherein the recording layer is initialized with light having a wavelength λ incident from the second dielectric layer side, and the thickness of the second dielectric layer is in a range of λ/(12×n) to λ/(2×n) (where n is a refractive index of the second dielectric layer).

12 Claims, 10 Drawing Sheets

Movement direction of a substrate

U.S. PATENT DOCUMENTS

| | | | |
|---|---|---|---|
| 6,346,322 B1 * | 2/2002 | Iwata et al. | 369/13.35 |
| 6,445,669 B1 | 9/2002 | Hattori et al. | |
| 6,449,221 B1 | 9/2002 | Knight et al. | |
| 2001/0005535 A1 | 6/2001 | Tsutsui et al. | |
| 2001/0018107 A1 | 8/2001 | Ishii | |
| 2003/0081510 A1 | 5/2003 | Murakami et al. | |

FOREIGN PATENT DOCUMENTS

| | | |
|---|---|---|
| JP | 10-340493 | 12/1998 |
| JP | 11-312342 | 11/1999 |
| JP | 2001-126332 | 5/2001 |

* cited by examiner

MAGNETO-OPTICAL RECORDING MEDIUM FOR USE IN DOMAIN WALL DISPLACEMENT DETECTION SYSTEM, AND METHOD FOR PRODUCING THE SAME

BACKGROUND OF THE INVENTION

1. Field of the Invention

The present invention relates to an optical disk used for recording/reproducing information and a method for producing the same.

2. Description of the Related Art

In the field of optical disks, there is a demand for high-density recording of information. As a method for realizing such high-density recording, a domain wall displacement detection (DWDD) system has been proposed.

In an optical disk of the DWDD system, it is required to weaken magnetic coupling between adjacent recording tracks. Therefore, in the case of producing an optical disk of the DWDD system, initialization for weakening magnetic coupling between adjacent recording tracks is conducted before recording an information signal. Such an initialization method has been reported in the past (see JP 6(1994)-290496 A and JP10(1998)-340493 A).

FIG. 10 shows an example of a structure and an initialization method of a conventional optical disk. As shown in FIG. 10, a conventional optical disk 1 includes a substrate 2, and a first dielectric layer 3, a recording layer 4, a second dielectric layer 5, and a protective coating layer 6 successively stacked on the substrate 2. On the surface of the substrate 2 on the side of the recording layer 4, grooves 2a are formed. A portion called a land is formed between two grooves 2a adjacent in the radial direction, and this portion becomes a recording track. The groove 2a has a width of, for example, 0.2 µm, and the land has a width of, for example, 1.4 µm. The recording layer 4 includes at least three magnetic layers for reproducing information by the DWDD system.

Next, an initialization method of the optical disk 1 will be described. According to the initialization method of the optical disk 1, laser light 7 (laser power=10 mW, λ=780 nm, NA of an objective lens 8=0.5, diameter of a light spot=about 800 nm) for annealing is radiated along the grooves 2a, thereby eliminating magnetic coupling of the recording layer 4 on the grooves 2a. During the initialization process, the relative moving speed of the light spot of the laser light 7 is, for example, 2 m/sec.

However, according to the initialization method as described above, portions other than the grooves 2a also are irradiated with a light spot. Therefore, an effective recording track becomes narrow, which decreases a signal level. This requires a light spot radiated to the recording layer 4 to be small. The first dielectric layer 3 is optimized in accordance with a wavelength of laser light for recording/reproducing, so that it is difficult to decrease the size of a light spot of the laser light 7 for annealing. Furthermore, for the same reason, it is difficult to enhance an absorption efficiency of the laser light 7 for annealing in the recording layer 4, so that initialization at a high linear velocity cannot be conducted, resulting in a long initialization time.

SUMMARY OF THE INVENTION

Therefore, with the foregoing in mind, it is an object of the present invention to provide an optical disk having a high recording density, which can be initialized in a short period of time, and a method for producing the same.

In order to achieve the above-mentioned object, there is provided a method for producing an optical disk including a substrate and a recording layer disposed above the substrate and reproducing an information signal by a DWDD system, using light incident from the substrate side, the method including the processes of: (i) forming a first dielectric layer, the recording layer, and a second dielectric layer on the substrate in this order; and (ii) irradiating the recording layer with laser light for initialization from the second dielectric layer side, thereby weakening magnetic coupling of a part of the recording layer. According to the above-mentioned method for producing an optical disk, an optical disk can be produced with a high recording density and satisfactory productivity. In the present specification, the term "initialization" refers to a process of weakening magnetic coupling between recording tracks by annealing a part of the recording layer.

In the above-mentioned production method, it is preferable that a wavelength of the laser light for initialization is λ, and a thickness of the second dielectric layer is in a range of $\lambda/(12 \times n)$ to $\lambda/(2 \times n)$ (where n is a refractive index of the second dielectric layer), particularly, in the vicinity of $\lambda/(4 \times n)$.

In the above-mentioned production method, the laser light for initialization may be obtained by condensing laser light by an objective lens with a numerical aperture of at least 0.65. According to this constitution, a laser spot can be made small, and an optical disk with a particularly high recording density can be produced.

In the above-mentioned production method, during the process (ii), the recording layer may be irradiated with laser light for tracking servo, whereby tracking servo is conducted. According to this constitution, the precision of tracking control is enhanced, so that positional precision in the radial direction of annealing also is enhanced, resulting in a stable DWDD operation.

In the above-mentioned production method, a wavelength of the laser light for initialization may be shorter than a wavelength of the laser light for tracking servo. According to this constitution, track density can be enhanced.

The above-mentioned production method further may include forming a heat conduction adjusting layer for adjusting the sensitivity of the recording layer on the second dielectric layer after the process (ii).

In the above-mentioned production method, during the process (ii), a region of the recording layer to be irradiated with the laser light for initialization may be heated before being irradiated with the laser light for initialization. According to this constitution, a time required for initialization can be shortened, and an optical disk can be produced with satisfactory productivity.

Furthermore, a first optical disk of the present invention includes a substrate and a recording layer disposed above the substrate, and reproduces an information signal by a DWDD system, using light incident from the substrate side, the optical disk further including a first dielectric layer disposed between the substrate and the recording layer and a second dielectric layer disposed on the recording layer opposite to the substrate, wherein magnetic coupling of a part of the recording layer is weakened by irradiation with light having a wavelength λ incident from the second dielectric layer side, and a thickness of the second dielectric layer is in a range of $\lambda/(12 \times n)$ to $\lambda/(2 \times n)$, where n is a refractive index of the second dielectric layer. In the above-mentioned optical disk, a thickness of the second dielectric layer is stipulated in accordance with laser light for initialization. Therefore, a spot of laser light for initialization can be made small, and the annealing efficiency by laser light for initialization can be enhanced. Thus, according to the above-mentioned constitution, an optical disk with a high recording density is obtained that can be initialized in a short period of time.

In the above-mentioned first optical disk, the second dielectric layer may be made of silicon nitride and may have a thickness in a range of 40 nm to 60 nm, and the wavelength λ may be in a range of 400 nm to 410 nm. According to this constitution, sufficient resistance to corrosion can be obtained. Furthermore, according to this constitution, the amount of light absorbed can be increased, and the energy of laser light required for initialization can be decreased.

In the above-mentioned first optical disk, the second dielectric layer may be made of silicon nitride and may have a thickness in a range of 25 nm to 30 nm, and the wavelength λ may be in a range of 400 nm to 440 nm. According to this constitution, since the second dielectric layer is thin, an optical disk can be produced with satisfactory productivity.

In the above-mentioned first optical disk, a refractive index of the second dielectric layer may be larger than a refractive index of the first dielectric layer. According to this constitution, even the relatively thin second dielectric layer can utilize laser light for initialization efficiently, so that a time required for forming the second dielectric layer can be shortened.

The above-mentioned first optical disk further may include a heat conduction adjusting layer disposed on the second dielectric layer for adjusting the sensitivity of the recording layer. According to this constitution, the sensitivity of the recording layer can be adjusted, and a power range enabling information to be recorded/reproduced can be enlarged.

The above-mentioned first optical disk further may include a protective coating layer formed on the second dielectric layer opposite to the substrate, and the protective coating layer may be thinner than the substrate.

In the above-mentioned first optical disk, a difference in level may be formed on a surface of the substrate on the recording layer side, and recording tracks of the recording layer may be separated magnetically by the difference in level. According to this constitution, by irradiating lands with laser light for initialization, a region with a narrow width can be annealed using a light confinement effect. An optical disk is obtained in which magnetic coupling between recording tracks can be cut off easily, and a track pitch can be made narrow. Furthermore, by using grooves as recording tracks, portions with less surface roughness are used as recording tracks, whereby an optical disk with satisfactory DWDD characteristics can be obtained.

Furthermore, a second optical disk of the present invention includes a substrate and a recording layer disposed above the substrate, and reproduces an information signal by a DWDD system, using light incident on the substrate side, wherein sample servo pits for conducting tracking control by a sample servo system are formed on the substrate, grooves to be recording tracks are formed in a concentric shape or a spiral shape in a recording/reproducing region of the substrate, a track pitch of the recording tracks is in a range of 0.5 μm to 0.6 μm, and the recording track is cut off magnetically from an adjacent recording track by allowing a laser spot of laser light having a wavelength λ in a range of 400 nm to 440 nm to scan an inter-groove portion.

The above-mentioned second optical disk may include a first dielectric layer disposed between the substrate and the recording layer, and a second dielectric layer disposed on the recording layer opposite to the substrate, wherein the recording track may be cut off magnetically from an adjacent recording track by irradiation with laser light from the second dielectric layer side.

In the above-mentioned second optical disk, a thickness of the second dielectric layer may be in a range of $\lambda/(12 \times n)$ to $\lambda/(2 \times n)$, where n is a refractive index of the second dielectric layer. In the second optical disk, information can be recorded with a high density. Furthermore, in the second optical disk, information can be reproduced with laser light having a wavelength in a range of 600 nm to 650 nm. A light source (laser diode) of laser light in such a wavelength range can be obtained easily, output a high power, and have stable characteristics.

In the above-mentioned second optical disk, a reflectivity $R_G$ of the groove and a reflectivity $R_L$ of the inter-groove portion may satisfy $0.95 < R_G/R_L \leq 1.0$. According to this constitution, the movement of magnetic domain walls becomes smooth, and a signal ratio is enhanced.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings.

Embodiment 1

Figure 1A:
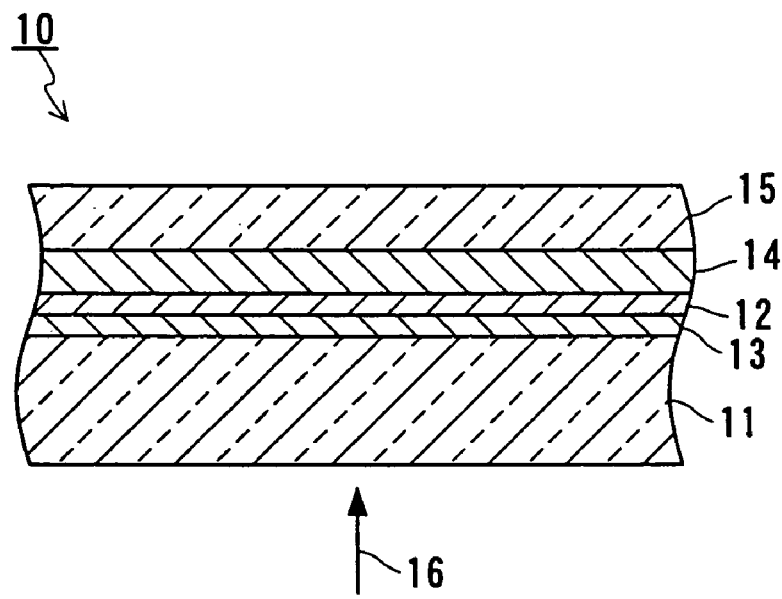
FIG. 1A is a partial cross-sectional view showing an example of an optical disk according to the present invention.

In Embodiment 1, an example of an optical disk of the present invention will be described. FIG. 1A is a partial cross-sectional view of an optical disk 10 of Embodiment 1.

Referring to FIG. 1A, an optical disk 10 includes a substrate 11, a recording layer 12 disposed above the substrate 11, a first dielectric layer 13 disposed between the substrate 11 and the recording layer 12, a second dielectric layer 14 disposed on the recording layer 12 opposite to the substrate 11, and a protective coating layer 15 disposed on the second dielectric layer 14. The optical disk 10 reproduces an information signal by using light 16 incident on the side of the substrate 11. In the recording layer 12, magnetic coupling is weakened partially by using light with a wavelength $\lambda$ that is incident on the side of the second dielectric layer 14.

Figure 4:
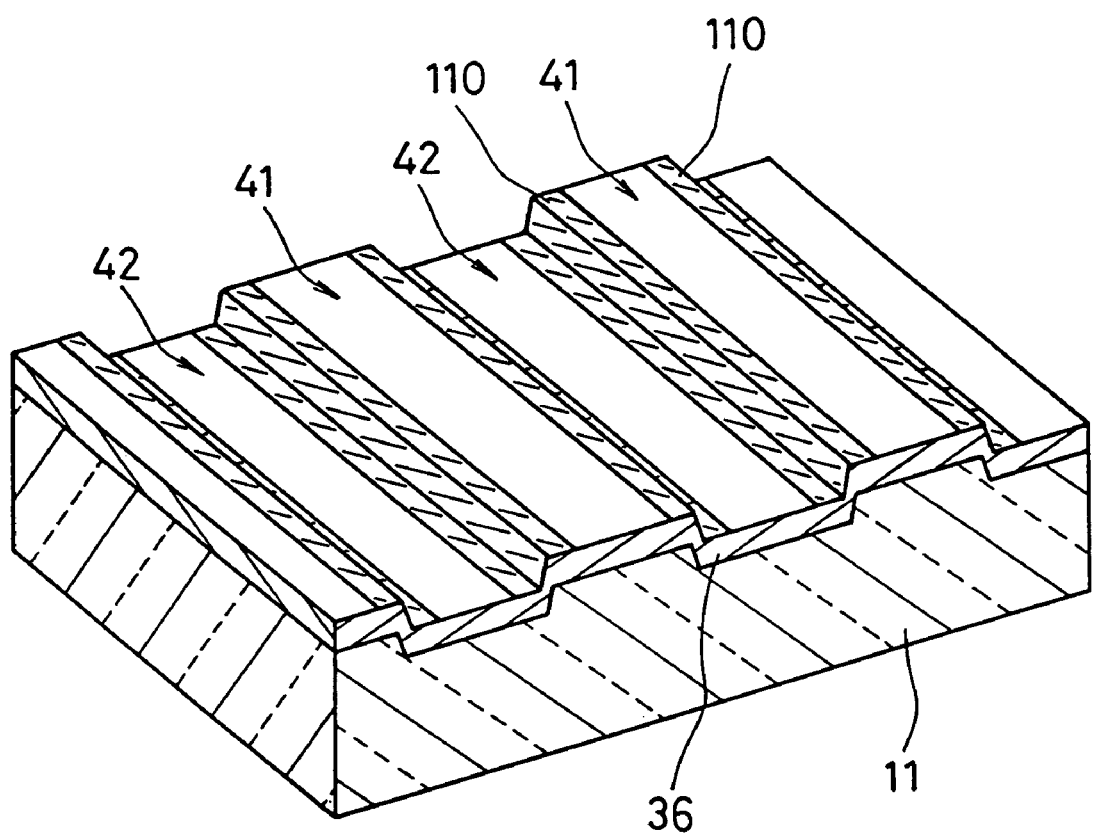
FIG. 4 is a perspective view schematically showing an exemplary structure of an optical disk produced by the method for producing an optical disk according to the present invention.
Figure 5:
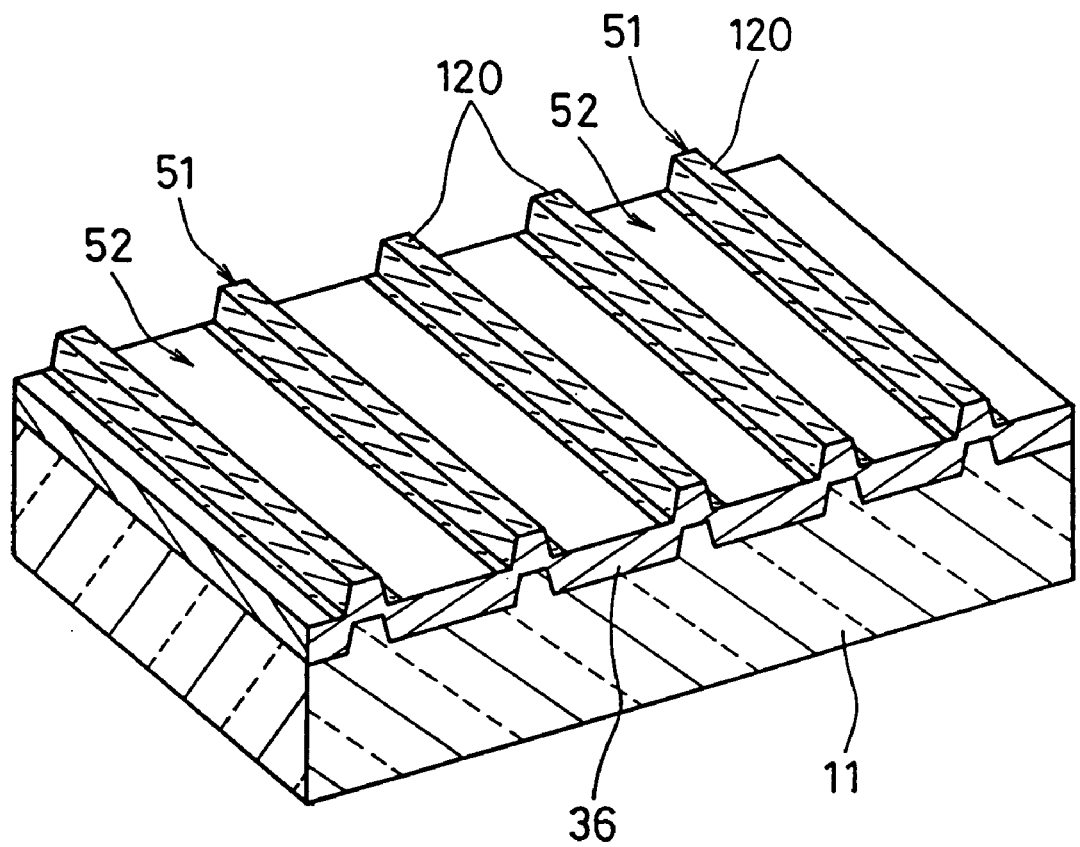
FIG. 5 is a perspective view schematically showing another exemplary structure of an optical disk produced by a method for producing an optical disk according to the present invention.

The substrate 11 has a disk shape. As a material for the substrate 11, for example, polycarbonate, glass, or the like can be used. The thickness of the substrate 11 is, for example, about 0.5 mm to about 1.2 mm. As shown in FIGS. 4 and 5, a difference in level is formed on the surface of the substrate 11 on the side of the recording layer 12, and the recording layer 12 may be separated magnetically by the difference in level.

A transparent dielectric material can be used for the first dielectric layer 13 and the second dielectric layer 14. For example, silicon nitride such as $Si_3N_4$, AlN, $SiO_2$, SiO, ZnS, or $MgF_2$ can be used. A material for the first dielectric layer 13 may be the same as or different from that for the second dielectric layer 14.

The thickness of the second dielectric layer 14 is set so as to have a low reflectivity with respect to laser light for initialization radiated on the side of the second dielectric layer 14, and efficiently absorb the light. More specifically, the thickness of the second dielectric layer 14 preferably is about $\lambda/(4 \times n)$, i.e., in a range of $\lambda/(12 \times n)$ to $\lambda/(2 \times n)$ (preferably, in a range of $\lambda/(6 \times n)$ to $\lambda/(2 \times n)$). Unlike a conventional optical disk, in the optical disk 10, initialization is conducted by radiating laser light for initialization (annealing) on the side of the second dielectric layer 14, whereby initialization can be conducted efficiently. Furthermore, in the optical disk 10, a light spot of laser light for initialization can be made small, so that the effective width of a recording track can be increased. Furthermore, since an absorption efficiency of laser light for initialization in the recording layer 12 can be enhanced, scanning of a light spot can be conducted at a high linear velocity, resulting in a shortened initialization time.

More specifically, in the case where silicon nitride having a refractive index of about 2 is used as the second dielectric layer 14, and a wavelength $\lambda$ of laser light for initialization is in a range of 400 nm to 410 nm, the thickness of the second dielectric layer 14 preferably is set in a range of 40 nm to 60 nm. Furthermore, in the case where silicon nitride having a refractive index of about 2 is used as the second dielectric layer 14, and a wavelength $\lambda$ of laser light for initialization is in a range of 400 nm to 440 nm, the thickness of the second dielectric layer 14 preferably is set in a range of 25 nm to 30 nm.

The protective coating layer 15 can be formed of the same material as that for the substrate 11. However, it is preferable that the refractive index of the protective coating layer 15 is larger than that of the substrate 11. The protective coating layer 15 may be formed, for example, by coating the second dielectric layer 14 with UV-curable resin, followed by curing it. Alternatively, a substrate may be attached to the second dielectric layer 14.

The recording layer 12 includes at least three magnetic layers so that information can be reproduced by the DWDD system. The recording layer 12 is initialized by using light with a wavelength $\lambda$ that is incident on the side of the second dielectric layer 14. In the case where the recording layer 12 includes a first magnetic layer 21, a second magnetic layer 22, and a third magnetic layer 23 stacked successively from the substrate 11, the following can be used as a material for each layer. For the first magnetic layer 21, a material can be used that has a small magnetic domain wall coercive force, small saturation magnetization in a temperature range in the vicinity of a Curie temperature of the second magnetic layer 22, and a Curie temperature lower than that of the third magnetic layer 23 and higher than that of the second magnetic layer 22. For example, GdCo, GdFeCo, or an alloy thereof having a Curie temperature of about 220° C. to about 260° C. can be used.

For the second magnetic layer 22, it is preferable to use a material having a Curie temperature lower than that of the first magnetic layer 21 and the third magnetic layer 23, and having a large magnetic domain wall coercive force up to a temperature immediately below the Curie temperature. For example, DyFe, TbFe, or an alloy thereof can be used that typically has a Curie temperature of 140° C. to 180° C.

For the third magnetic layer 23, a material can be used that has a large magnetic domain wall coercive force, a Curie temperature higher than that of the first magnetic layer 21 and the second magnetic layer 22, and small saturation magnetization in a temperature range in the vicinity of the Curie temperature of the second magnetic layer 22. For example, TbFeCo or an alloy thereof that has a Curie temperature of 280° C. to 300° C. can be used.

Hereinafter, the function of an optical disk will be described with reference to FIGS. 2A to 2D, in which the recording layer 12 includes the first magnetic layer 21, the second magnetic layer 22, and the third magnetic layer 23 stacked successively from the substrate 11.

Figure 2A:
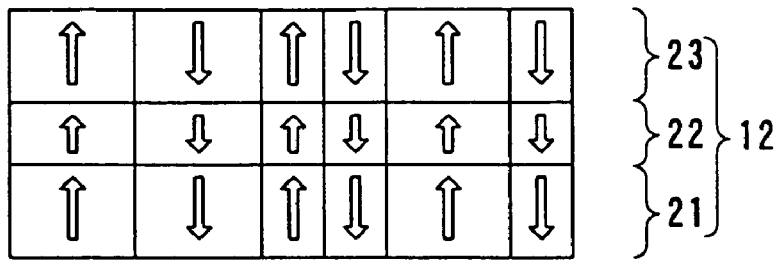
FIGS. 2A to 2D are schematic views showing a function of the optical disk according to the present invention.

FIG. 2A schematically shows a state of the recording layer 12 that is not irradiated with reproducing laser light. An information signal is recorded on the third magnetic layer 23 as magnetization information. In the absence of irradiation with reproducing laser light, the first magnetic layer 21, the second magnetic layer 22, and the third magnetic layer 23 are coupled to each other with exchange interaction. Therefore, the magnetization information of the third magnetic layer 23 is transferred to the second magnetic layer 22 and the first magnetic layer 21.

Figure 2B:
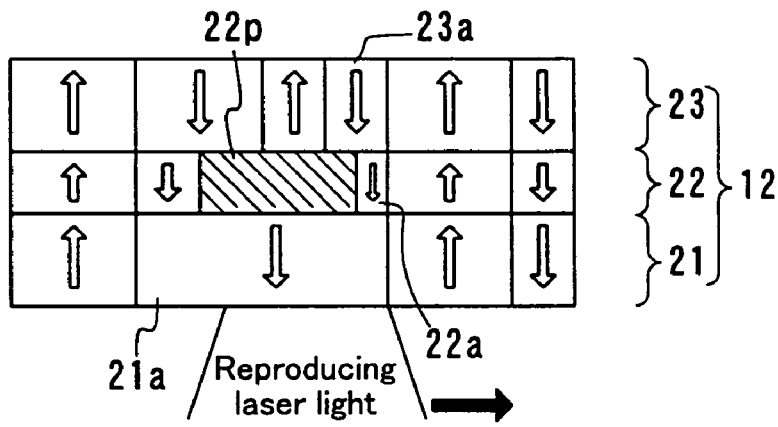

FIG. 2B schematically shows a state of the recording layer 12 irradiated with reproducing laser light. Reproducing laser light moves relatively with respect to the optical disk in the arrow direction. When the temperature of each layer rises upon irradiation with reproducing laser light, a portion 22p (represented by a shaded area in the figure) is generated partially in the second magnetic layer 22, in which the temperature becomes equal to or higher than a Curie temperature. In the portion 22p, exchange coupling between the first magnetic layer 21 and the third magnetic layer 23 is cut off. At this time, due to a gradient of an energy density of a magnetic domain wall dependent upon a temperature, magnetic domain walls of the magnetic layer 21 move. Therefore, in a portion of the first magnetic layer 21 adjacent to the portion 22p, an enlarged magnetic domain 21a is present. Then, information of a magnetic domain 23a of the third magnetic layer 23 is transferred to the enlarged magnetic domain 21a via a magnetic domain 22a that is positioned forward of the portion 22p (the relative movement direction of reproducing laser light with respect to the substrate 11 is assumed to be the forward direction. This corresponds to the arrow direction in FIG. 2B).

Figure 2C:
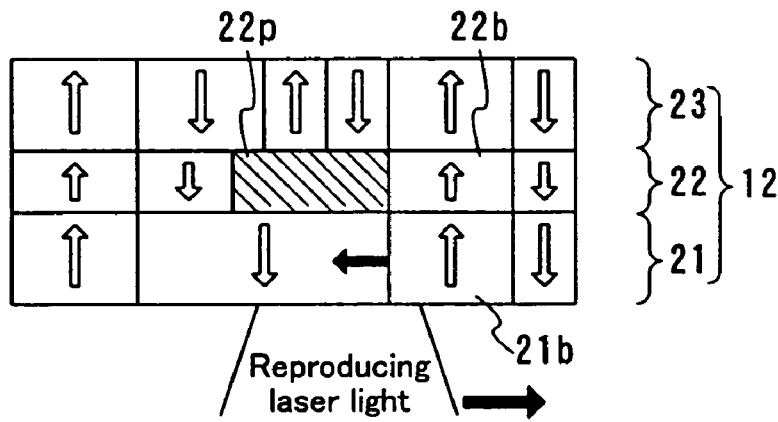
Figure 2D:
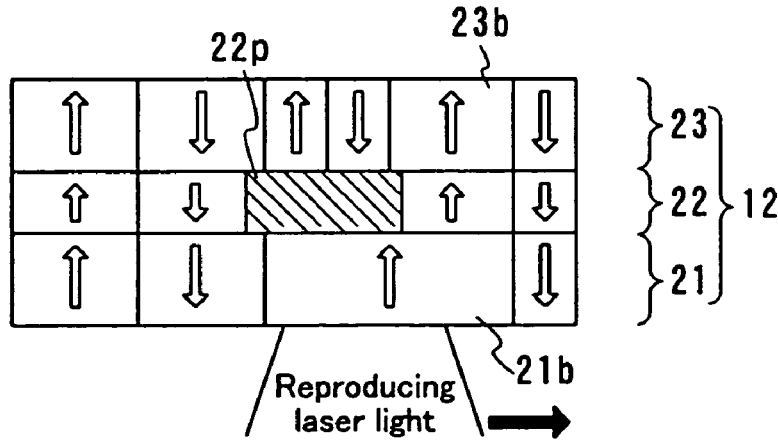

When reproducing laser light moves forward from the state in FIG. 2B, as shown in FIG. 2C, the temperature of the magnetic domain 22a rises to form the portion 22p. At this time, a magnetic domain wall of the magnetic domain 21b adjacent to the magnetic domain 22b positioned forward of the portion 22p moves. Then, as shown in FIG. 2D, an enlarged magnetic domain 21b is formed. The information of the magnetic domain 23b is transferred to the enlarged magnetic domain 21b via the second magnetic layer 22.

As described above, according to the DWDD system, information recorded in the third magnetic layer 23 is enlarged and transferred to the first magnetic layer 21. Thus, according to the DWDD system, it is possible to reproduce information of a magnetic domain that is smaller than a spot diameter of reproducing laser light. In the optical disk 10, information is reproduced by the DWDD system, whereby information can be recorded/reproduced at a high density. Recording of information onto such a minute magnetic domain can be conducted by optical pulse magnetic field modulation recording or the like.

As described above, according to Embodiment 1, an optical disk with a high recording density is obtained that can be initialized in a short period of time.

Figure 1B:
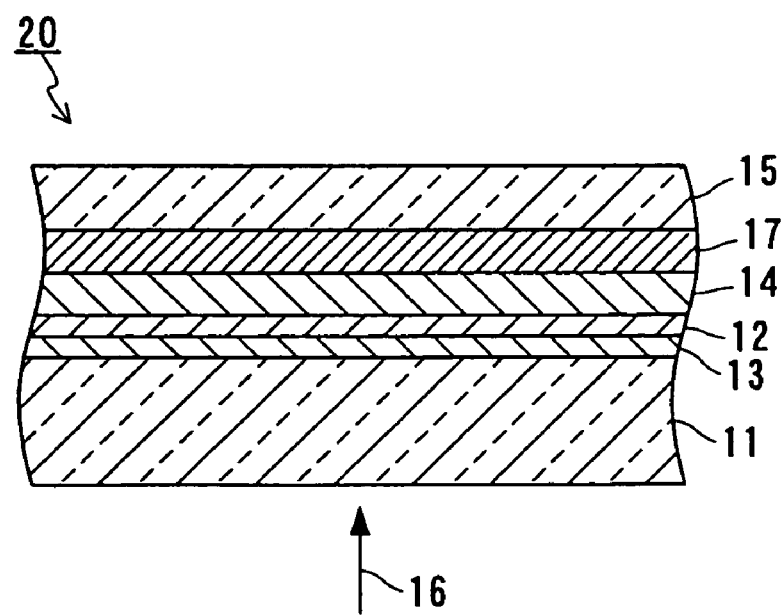
FIG. 1B is a partial cross-sectional view showing another example thereof.

The optical disk 10 of the present invention further may include a heat conduction adjusting layer for adjusting the sensitivity of the recording layer 12 between the second dielectric layer 14 and the protective coating layer 15. FIG. 1B is a partial cross-sectional view of an optical disk 20 having a heat conduction adjusting layer 17. As the heat conduction adjusting layer 17, a metal film can be used. For example, a film made of aluminum or gold can be used. The thickness of the heat conduction adjusting layer 17 generally is about 50 nm to about 500 nm.

Embodiment 2

In Embodiment 2, an example of a method for producing an optical disk according to the present invention will be described. Embodiment 2 is directed to a method for producing an optical disk that reproduces an information signal by the DWDD system, using light incident on a substrate side. In Embodiment 2, the case will be described in which the optical disk 10 of Embodiment 1 is produced. Furthermore, the same components as those described in Embodiment 1 are denoted with the same reference numerals as those therein, and a repeated description thereof will be omitted herein (this also applies to the other embodiments).

According to the production method of Embodiment 2, the first dielectric layer 13, the recording layer 12, and the second dielectric layer 14 are formed on the substrate 11 in this order (hereinafter, this process may be referred to as "Process (i)"). These layers can be formed continuously by, for example, sputtering using a magnetron sputtering apparatus, vapor deposition, or the like. In particular, a plurality of magnetic layers constituting the recording layer 12 are allowed to maintain magnetic exchange coupling by being formed continuously without breaking a vacuum state. Layers other than those described above may be formed between the substrate 11 and the second dielectric layer 14.

After Process (i), the recording layer 12 is irradiated with laser light having a wavelength λ from the side of the second dielectric layer 14, whereby initialization for weakening magnetic coupling of a part of the recording layer 12 is conducted (hereinafter, this process may be referred to as "Process (ii)"). The initialization process will be described later.

After Process (ii), the protective coating layer 15 may be formed on the second dielectric layer 14. The protective coating layer 15 also may be formed between Process (i) and Process (ii).

Furthermore, after Process (ii), the heat conduction adjusting layer 17 described in Embodiment 1 may be formed on the second dielectric layer 14. The heat conduction adjusting layer 17 can be formed by sputtering or vapor deposition. In this case, the protective coating layer 15 is formed after the heat conduction adjusting layer 17 is formed.

Hereinafter, an example of the initialization process (Process (ii)) of the optical disk 10 will be described. In the following, initialization of the optical disk 10 will be described that uses a substrate 11 made of polycarbonate having a refractive index of 1.58, a first dielectric layer 13 (thickness: 50 nm) made of $Si_3N_4$, a second dielectric layer 14 (thickness: 40 nm) made of $Si_3N_4$, and a protective coating layer 15 (thickness: 10 μm) made of an acrylic UV-curable resin having a refractive index of 1.6. Similarly, in the following, initialization of the optical disk 10 will be described in which the recording layer 12 includes the first magnetic layer 21, the second magnetic layer 22, and the third magnetic layer 23 successively stacked from the substrate 11 as shown in FIG. 2A Herein, the first magnetic layer 21 is a GdCo layer (thickness: 30 nm), the second magnetic layer 22 is a DyFe layer (thickness: 10 nm), and the third magnetic layer 23 is a TbFeCo layer (thickness: 40 nm).

Figure 3:
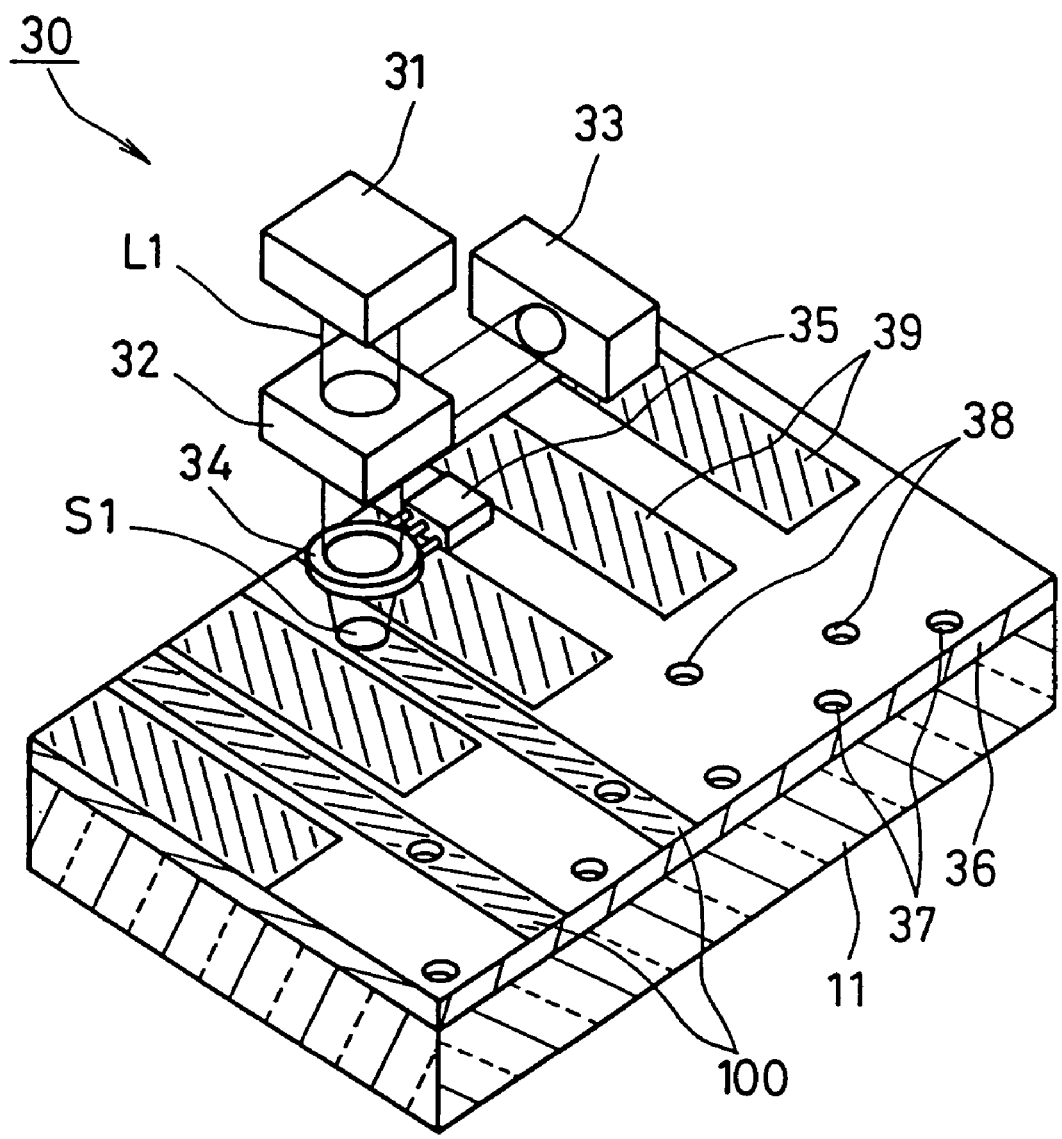
FIG. 3 is a perspective view schematically showing an example of one process of a method for producing an optical disk according to the present invention.

FIG. 3 schematically shows an exemplary structure of an initialization apparatus 30 used for initializing the optical disk 10. Referring to FIG. 3, the initialization apparatus 30 includes a laser light source 31 for annealing, a beam splitter 32, a focus detector 33, an objective lens 34 (NA= 0.85), and a focus actuator 35. In FIG. 3, the first dielectric layer 13, the recording layer 12, and the second dielectric layer 14 are collectively defined as a recording/reproducing layer 36.

The optical disk 10 in FIG. 3 includes clock pits 37 and wobble pits 38. Parts of the recording/reproducing layer 36 become recording tracks 39. The wavelength of laser light used for recording/reproducing is in the range of 600 nm to 680 nm. The diameter of a laser spot of laser light for recording/reproducing is in the range of about 0.45 μm to about 0.60 μm. The track pitch of a recording track is in the range of 0.6 μm to 0.7 μm. The reflectivity $R_R$ of a recording track 39 with respect to laser light used for recording/reproducing and a reflectivity $R_M$ of a mirror portion (i.e., a region between adjacent two recording tracks) satisfy $0.95 < R_R/R_M \leq 1.0$.

Laser light L1 (wavelength: 650 nm) for annealing emitted from the laser light source 31 passes through the beam splitter 32 and is condensed by the objective lens 34 to form a laser spot S1. In the initialization apparatus 30, the objective lens 34 with an NA of 0.85 corresponding to the thickness of the protective coating layer 15 is used, so that the laser spot S1 becomes smaller than that of the conventional apparatus, and its diameter becomes 380 nm. Light reflected from the laser spot S1 is detected by the focus detector 33 via the objective lens 34 and the beam splitter 32. The focus actuator 35 is driven based on the detected signal, and controls the laser spot S1 so that its diameter is not largely changed.

Initialization of the optical disk 10 is conducted by radiating the laser light L1 to a region between two recording tracks 39 adjacent in the radial direction, thereby annealing the region. More specifically, the laser light L1 is controlled so that the laser spot S1 scans a region between two adjacent recording tracks. In other words, the laser spot S1 scans a line away from the center of the recording track by ½ of a track pitch in the radial direction. At this time, the laser spot S1 is moved at an appropriate linear velocity with respect to the recording/reproducing layer 36 of the optical disk 10 by using a rotation drive mechanism (not shown) for moving the optical disk 10 and a mechanism (not shown) for moving the laser spot S1 in the radial direction of the optical disk. Thus, initialization for forming annealed regions 100 can be conducted by irradiation with the laser light L1. In the annealed regions 100, the temperature of the first magnetic layer 21, the second magnetic layer 22, and the third magnetic layer 23 rises, and a magnetization state thereof becomes different from that of the periphery. As a result, magnetic coupling is cut off in the annealed regions 100. In the case where an emission laser power of the laser light source 31 is 50 mW, the width of the annealed region 100 can be set to be 0.18 µm at a linear velocity of 20 m/sec. This is caused by the following: the wavelength of the laser light L1 used for initialization is shorter than that of the laser light for initialization described in the conventional example; the NA of the used objective lens 34 is larger than that described in the conventional example, and the thickness of the second dielectric layer 14 is set so that the absorption of the laser light L1 becomes largest.

FIG. 3 shows an example of an optical disk of a sample servo tracking system. The present invention is not limited thereto (this also applies to the other embodiments). For example, as shown in FIG. 4, lands 41 and grooves 42 may function as recording tracks. In this case, each annealed region 110 may be formed in a difference in level between the land 41 and the groove 42. Furthermore, as shown in FIG. 5, an optical disk may include lands 51 with a small width and grooves 52 with a large width, and the grooves 52 may function as recording tracks. In this case, the annealed regions 120 may be formed on the lands 51. Furthermore, in contrast with FIG. 5, an optical disk may have lands with a large width and grooves with a small width, and the lands may function as recording tracks.

In Embodiment 2, as a material for the second dielectric layer 14, $Si_3N_4$ with a refractive index of 2.0 is used. However, as a material for the second dielectric layer 14, ZnSe with a refractive index of 2.6 and ZnS with a refractive index of 2.2 may be used (this also applies to the other embodiments). In this case, even the relatively thin second dielectric layer 14 can use laser light for initialization efficiently. Therefore, there is an advantage that a film formation time of the second dielectric layer 14 can be shortened. Furthermore, by setting an imaginary part of a complex refractive index of the second dielectric layer 14 at a wavelength of laser light for initialization smaller than 0.1, an energy loss during initialization can be decreased, and initialization can be conducted with a smaller power or in a shorter period of time. Furthermore, by setting a transmittance of laser light for initialization in the second dielectric layer 14 at 90% or more, initialization can be conducted with a smaller power or in a shorter period of time.

Furthermore, in Embodiment 2, the protective coating layer 15 is made of acrylic resin with a refractive index of 1.6, and the substrate 11 is made of polycarbonate with a refractive index of 1.56. However, even when the refractive index of the protective coating layer 15 is equal to or less than that of the substrate 11, the effects of the present invention can be obtained (this also applies to the other embodiments).

Furthermore, in Embodiment 2, initialization using the laser light L1 is conducted before forming the protective coating layer 15. However, it also is possible to conduct initialization after forming the protective coating layer 15 (this also applies to the other embodiments).

Embodiment 3

In Embodiment 3, another exemplary method for producing an optical disk according to the present invention will be described. The production method of Embodiment 3 is different from that of Embodiment 2 only in the initialization process (Process (ii)). Therefore, a repeated description thereof will be omitted here.

Figure 6:
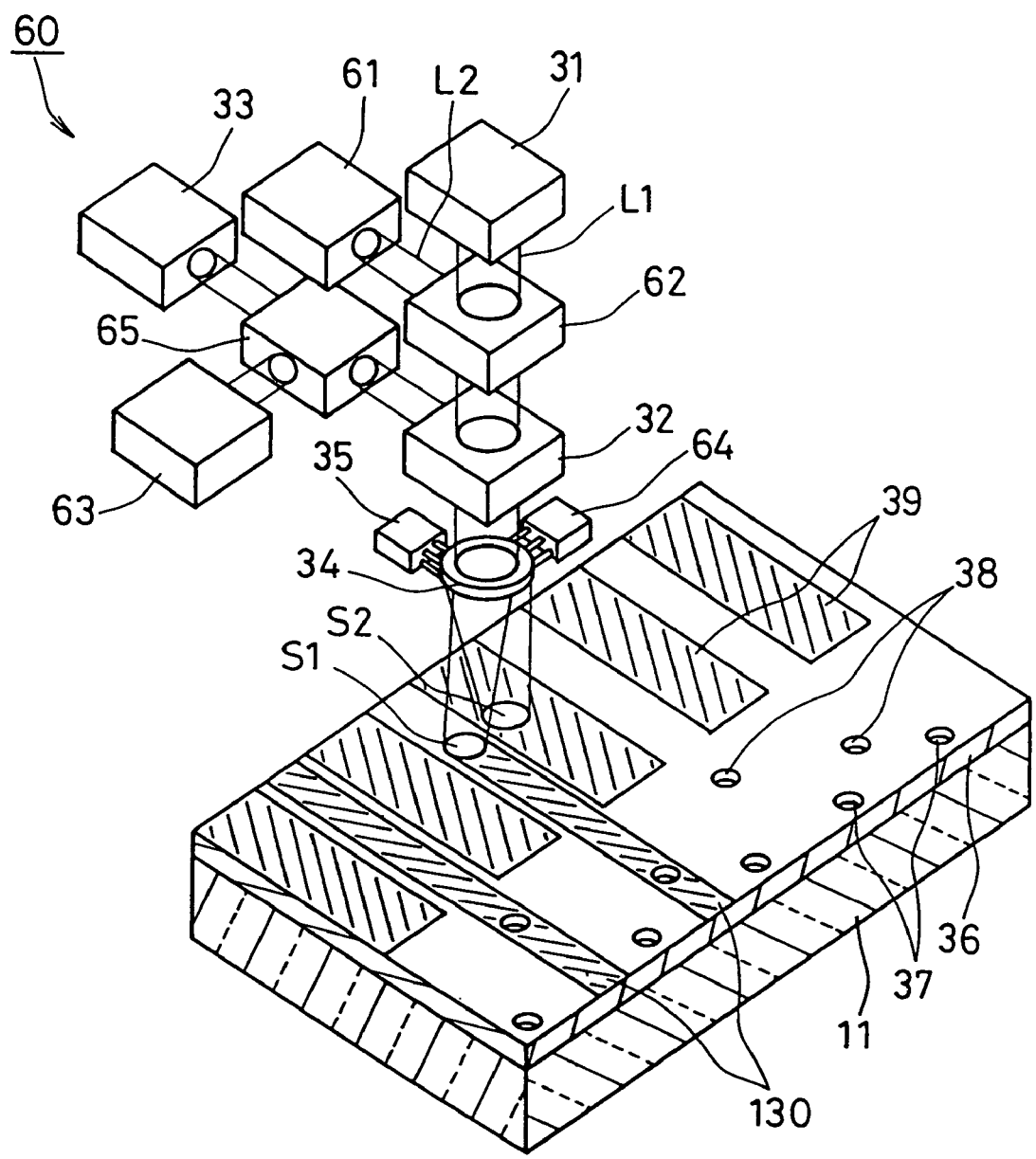
FIG. 6 is a perspective view schematically showing another example of one process of a method for producing an optical disk according to the present invention.

Hereinafter, the initialization method of Embodiment 3 will be described. FIG. 6 schematically shows a structure of an initialization apparatus 60 used by the production method of Embodiment 3.

Referring to FIG. 6, the initialization apparatus 60 includes a laser light source 31 for annealing, laser beam splitters 32, 62 and 65, a focus detector 33, an objective lens 34, a focus actuator 35, a laser light source 61 for tracking servo, a photodetector 63, and a tracking actuator 64.

An operation of the initialization apparatus 60 will be described with reference to FIG. 6. Laser light L2 emitted from the laser light source 61 passes through the beam splitters 62 and 32, and is condensed by the objective lens 34 to form a laser spot S2. Simultaneously, laser light L1 emitted from the laser light source 31 for initialization passes through the beam splitters 62 and 32, and is condensed by the objective lens 34 to form a laser spot S1. The distance between the center of the laser spot S1 and the center of the laser spot S2 is set so as to be substantially a half of a pitch of a recording track 39. A line connecting the center of the laser spot S1 to that of the laser spot S2 is set so as to be perpendicular to a longitudinal direction of the recording track 39.

Light reflected from the laser spot S2 enters the beam splitter 32 via the objective lens 34, and bends its optical path in the direction of the beam splitter 65 to enter the photodetector 63. A window gate appropriate for a signal from the photodetector 63 is provided to obtain a sampling servo signal. The sampling servo signal is sent to the tracking actuator 64 and controls the laser spot S2 so that it scans the recording track 39.

Reflected light from the laser spot S1 enters the beam splitter 32 via the objective lens 34, and bends its optical path in the direction of the beam splitter 65 to enter the focus detector 33. A signal from the focus detector 33 is sent to the focus actuator 35 and operates it, thereby controlling the laser spot S1 so that the diameter thereof is not largely changed.

When the laser spot S1 and the optical disk are moved at an appropriate linear velocity by using a rotation drive mechanism (not shown) of an optical disk and a mechanism (not shown) for moving the laser spots S1 and S2 in the radial direction of the optical disk, annealed regions 130 can be formed between the adjacent recording tracks 39. In the annealed regions 130, the temperature of the first magnetic layer 21, the second magnetic layer 22, and the third magnetic layer 23 rises, and a magnetization state thereof becomes different from that of the periphery. As a result, magnetic coupling is cut off in the annealed regions 130.

In the case of the production method of Embodiment 3, tracking servo can be conducted by the laser spot S2. Therefore, the optical disk can be moved in the radial direction with a simple mechanism.

Furthermore, anneal processing can be conducted by reading an address of the optical disk. Therefore, heating and measurement of a temperature as shown in Embodiment 4 can be conducted.

In Embodiment 3, a method for producing an optical disk of a sample servo tracking system has been described. However, the optical disk shown in FIG. 4 or 5 described in Embodiment 2 also can be produced similarly.

According to the production method of Embodiment 3, regions of the recording/reproducing layer 36 to be scanned by the laser spot S1 may be heated immediately before the laser spot S1 scans them (this also applies to the other embodiments). Such heating can be conducted, for example, by irradiation with infrared rays, electromagnetically induced heating, microwave heating, or laser heating. Regarding the case of conducting heating by irradiation with infrared rays, FIG. 7 schematically shows a part of an initialization apparatus.

Figure 7:
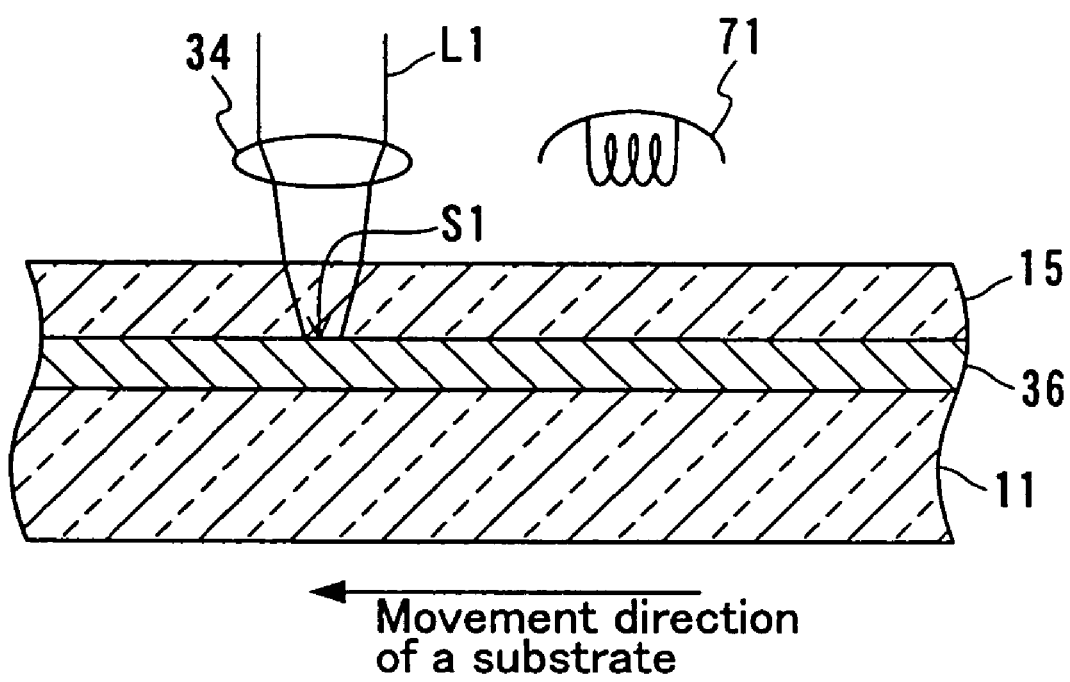
FIG. 7 is a cross-sectional view schematically showing still another example of one process of a method for producing an optical disk according to the present invention.

In FIG. 7, the recording/reproducing layer 36 of the optical disk moves relatively with respect to the objective lens 34 in the arrow direction. The initialization apparatus in FIG. 7 is provided with an infrared irradiation apparatus 71 in addition to the initialization apparatus in FIG. 6. The infrared irradiation apparatus 71 is disposed at a position immediately before a scanning position of the laser light L1.

According to the production method using the initialization apparatus in FIG. 7, infrared rays are radiated from the infrared irradiation apparatus 71 to a position immediately before a scanning position of the laser spot S1. Because of this, the temperature of the recording/reproducing layer 36 is increased previously, and thereafter, initialization is conducted by anneal processing using the laser spot S1. Due to the infrared irradiation, the temperature of the recording/reproducing layer 36 can be increased to about 100° C., and a time required for initialization can be shortened by about 20%. Furthermore, the optical disk is stored in a thermostat kept at 100° C., and the above-mentioned infrared irradiation and scanning of the laser spot S1 are conducted under the condition that the temperature of the optical disk is kept, whereby a time required for initialization further can be shortened by about 10%.

Embodiment 4

In Embodiment 4, another example of a method for producing an optical disk according to the present invention will be described. The production method of Embodiment 4 is different from that described in Embodiment 2 only in the initialization process (Process (ii)). Therefore, a repeated description thereof will be omitted here.

Figure 8:
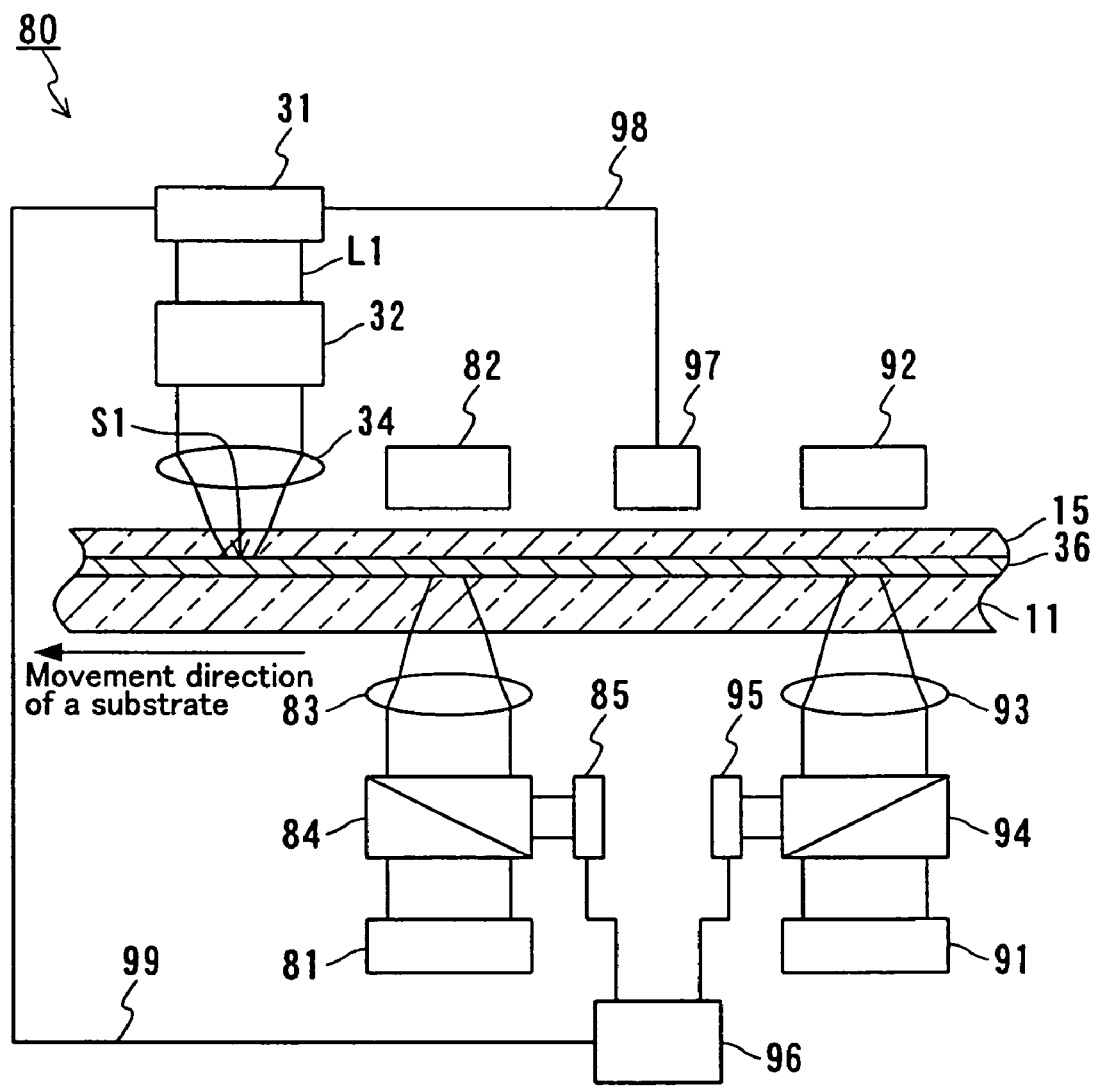
FIG. 8 is a perspective view schematically showing still another example of one process of a method for producing an optical disk according to the present invention.

FIG. 8 schematically shows a part of a structure of an initialization apparatus 80 used in Embodiment 4. In addition to the structure of the initialization apparatus 60 shown in FIG. 6, the initialization apparatus 80 includes a first laser light source 81 for reproducing, a first magnetic head 82 for recording, an objective lens 83, a beam splitter 84, a photodetector 85, a second laser light source 91 for reproducing, a second magnetic head 92 for recording, an objective lens 93, a beam splitter 94, a photodetector 95, an operation amplifier 96, and an infrared sensor 97.

Next, an operation of the initialization apparatus 80 will be described with reference to FIG. 8. An optical disk moves relatively with respect to a laser spot S1 in the arrow direction. Although not shown in FIG. 8, the focus of the laser spot S1 is controlled by a focus control system as shown in FIG. 3, and the tracking thereof is controlled by a tracking control system as shown in FIG. 6.

In order to measure a temperature at a portion immediately before a scanning position of the laser spot S1, the infrared sensor 97 is set at the position immediately before the scanning position of the laser spot S1. A signal regarding a temperature output from the infrared sensor 97 is fed back to the laser light source 31 to control an output of the laser light source 31. By adopting this system, for example, the uniformity of a width of an annealed region and the stability of a level of a reproduction signal during recording/reproducing information can be enhanced, and a noise level during reproducing can be reduced.

Alternatively, the following also may be possible: laser light emitted from the laser light source 81 is radiated to the recording/reproducing layer 36 on the side of the substrate 11 via the beam splitter 84 and the objective lens 83 to conduct tracking control and focus control; a rectangular wave type magnetic field with a single frequency is applied to and recorded on the recording/reproducing layer 36 by using the first magnetic head 82; and a reproduction signal level at this time is detected by the photodetector 85. A magnetooptical signal in the recording/reproducing layer 36 is changed in accordance with its temperature. Therefore, using the characteristics, a signal corresponding to a temperature at an irradiation point of laser light is obtained, and the signal thus obtained can be fed back to the laser light source 31 via a signal cable 99. In this case, a signal is obtained that corresponds to a temperature regarding a small portion immediately before a scanning position of the laser spot S1. The uniformity of a width of an annealed region further can be enhanced, and the stability of a reproduction signal level in a high frequency region can be enhanced. Furthermore, a noise level during reproducing in the high frequency region can be reduced.

Furthermore, in the presence of a heating apparatus such as the infrared irradiation apparatus 71 shown in FIG. 7, laser light emitted from the laser light source 91 may be radiated to a portion of the recording/reproducing layer 36 that is hardly influenced by the heating apparatus from the substrate 11 side via the beam splitter 94 and the objective lens 93, whereby tracking control and focus control are conducted. A rectangular wave type signal with a single frequency is recorded by the second magnetic head 92, and a signal level at this time is detected by the photodetector 95, whereby a signal is obtained that corresponds to a temperature of the recording/reproducing layer 36 in a laser irradiation potion. The difference between a signal from the photodetector 95 and that from the photodetector 85 is amplified by using the operation amplifier 96, and a signal thus obtained is fed back to the laser light source 31. When this method is adopted, even in the presence of the heating apparatus, an annealed region with a stable width can be obtained, and a large reproduction S/N ratio can be obtained.

In Embodiment 4, in order to measure a temperature, a signal corresponding to a temperature is obtained from the infrared sensor 97 or a magnetooptical signal. However, the temperature may be measured by another method.

Embodiment 5

Figure 9:
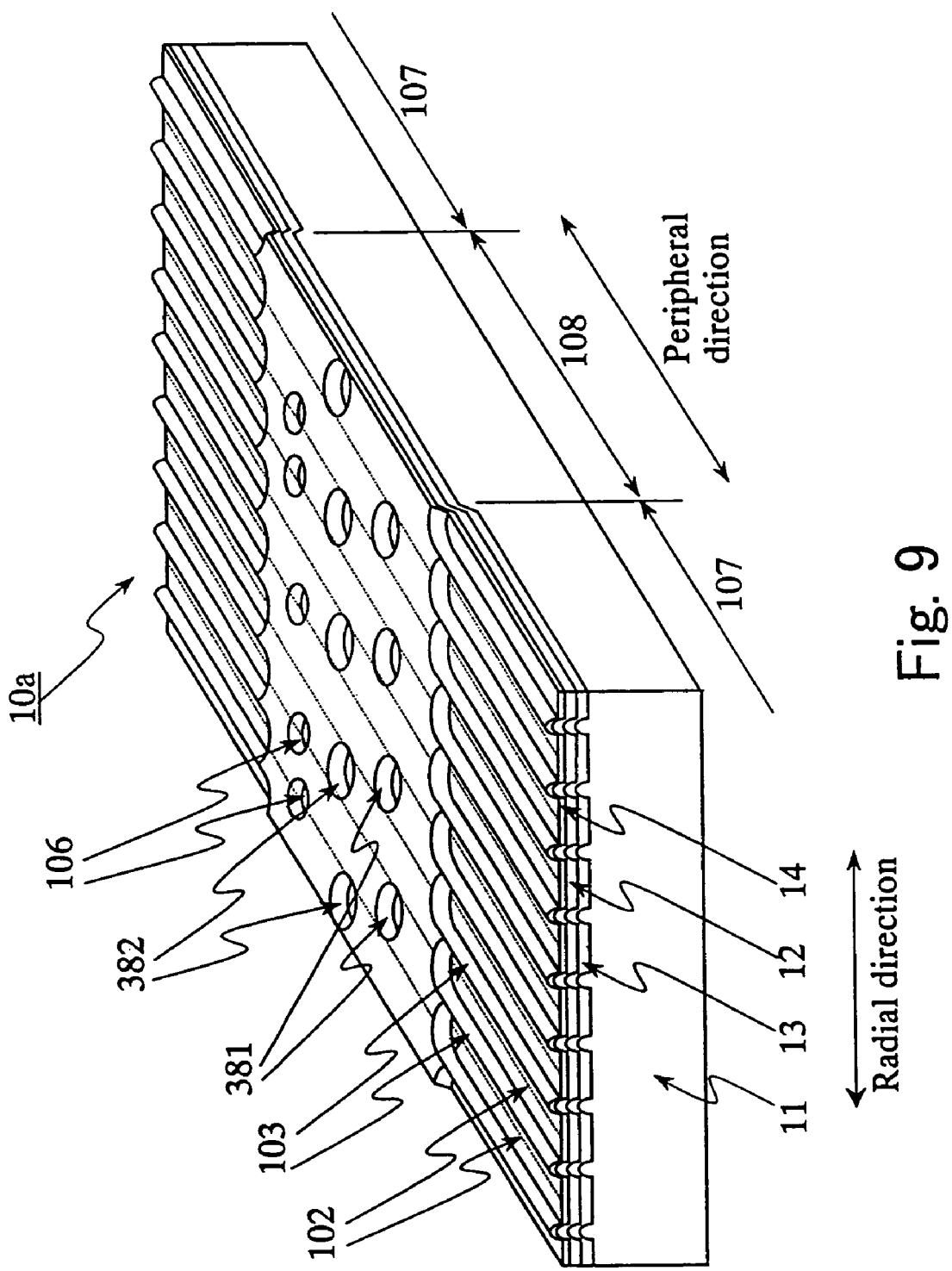
FIG. 9 is a partial sectional perspective view showing another example of the optical disk according to the present invention.
Figure 10:
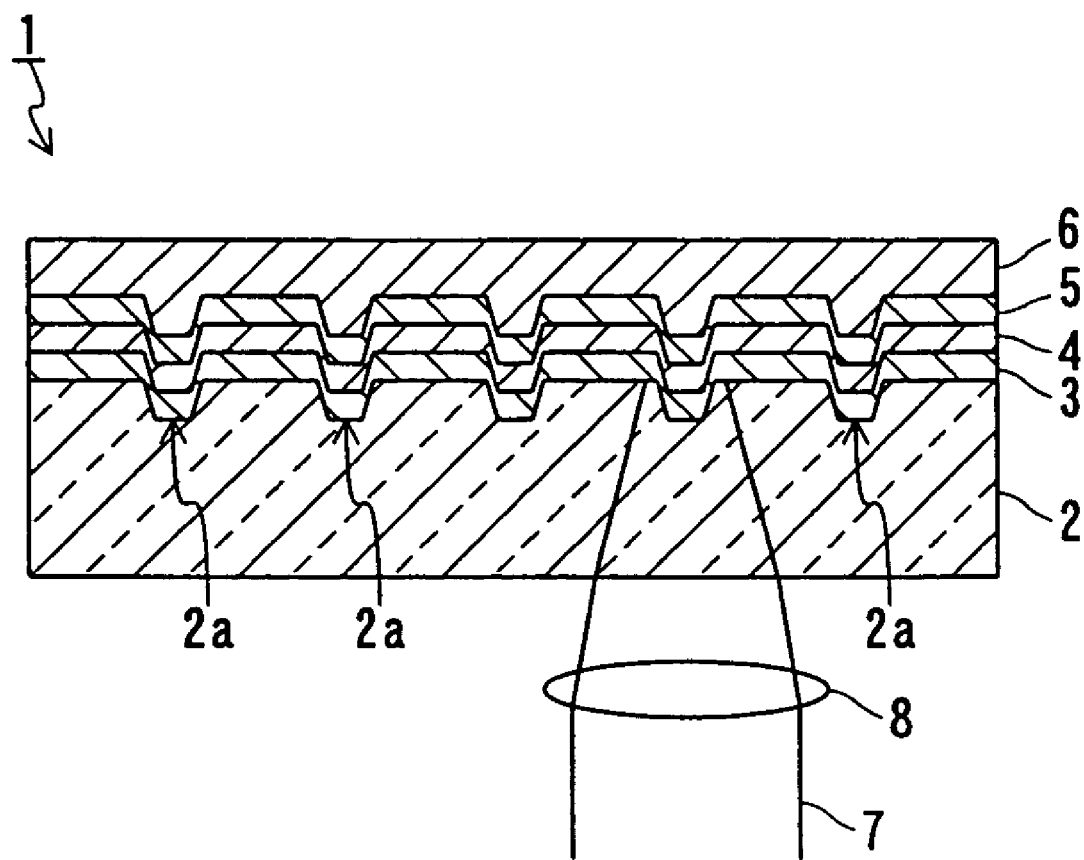
FIG. 10 is a cross-sectional view showing an example of a method for producing a conventional optical disk.

In Embodiment 5, another example of an optical disk and a method for producing the same according to the present invention will be described. An optical disk of Embodiment 5 is different from that of Embodiment 1 only in a configuration of a recording track. Furthermore, the production method of Embodiment 5 is different from that of Embodiment 2 only in the initialization process (Process (ii)). Therefore, a repeated description thereof will be omitted here. FIG. 9 is a partial sectional perspective view of an optical disk 10a of Embodiment 5. In FIG. 9, a partial hatching is omitted.

Referring to FIG. 9, the optical disk 10a includes a disk-shaped substrate 11, a recording layer 12 disposed above the substrate 11, a first dielectric layer 13 disposed between the substrate 11 and the recording layer 12, a second dielectric layer 14 disposed on the recording layer 12 opposite to the substrate 11, and a protective coating layer (not shown) disposed on the second dielectric layer 14.

In the optical disk 10a, data regions 107 and pit regions 108 are disposed alternately in the peripheral direction of the disk. In the data region 107, grooves 102 and lands 103 are disposed alternately in the radial direction. The grooves 102 are disposed in a concentric shape or a spiral shape in a recording/reproducing region of the substrate 11. The lands 103 correspond to inter-groove portions between adjacent two grooves 102. The grooves 102 correspond to portions to be recording tracks. A recording track is cut off magnetically from an adjacent recording track by irradiating the lands (inter-groove portions) 103 with a laser spot of laser light having a wavelength (e.g., in a range of 0.5 μm to 0.6 μm) shorter than that used for recording/reproducing. Herein, a reflectivity $R_G$ of the grooves 102 and a reflectivity $R_L$ of the lands 103 satisfy $0.95<R_G/R_L \leq 1.0$. In order to set the value of "$R_G/R_L$" in this range, the depth of the grooves 102 may be set at 40 nm or less. In order to weaken the magnetic coupling of a part of the recording layer 12, it is preferable that the depth of the grooves 102 is 20 nm or more. Thus, the depth of the grooves 102 preferably is in a range of 20 nm to 40 nm.

In the pit region 108, address pits 106 and wobble pits 381 and 382 are formed. The wobble pits 381 and 382 are sample servo pits for conducting tracking control by the sample servo system. Laser light used for recording/reproducing has a wavelength in a range of 600 nm to 650 nm. The diameter of a laser spot is in a range of about 0.45 nm to about 0.60 μm. The track pitch of a recording track is in a range of 0.5 μm to 0.6 μm. The width of the land 103 is in a range of 20% to 45% of the track pitch (herein, the track pitch is equal to the total width of the groove 102 and the land 103). The other features of the optical disk 10a are the same as those of the optical disk 10 described in Embodiment 1. For example, the thickness of the second dielectric layer 14 is in a range of $\lambda/(12 \times n)$ to $\lambda/(2 \times n)$ (n represents a refractive index of the second dielectric layer 14, and λ represents a wavelength of laser light for initialization).

An exemplary method for producing an optical disk of Embodiment 5 will be described.

First, in the same way as in Embodiment 2, a first dielectric layer 13, a recording layer 12, and a second dielectric layer 14 are formed successively on the substrate 11 (Process (i)).

After the Process (i), laser for initialization with a wavelength λ is radiated from the second dielectric layer 14 side to the recording layer 12, whereby initialization for weakening magnetic coupling of a part of the recording layer 12 is conducted. As the initialization apparatus, the same apparatus as that described in Embodiment 2 can be used. According to the production method of Embodiment 5, a laser light source 31 emitting a violet laser with a wavelength λ in a range of 400 nm to 440 nm is used. Furthermore, the beam splitter 32, the focus detector 33, the objective lens 34 (NA=0.85) and the focus actuator 35 are adjusted for violet laser.

Hereinafter, an initialization process will be described with reference to FIG. 3. In the following, the case will be described in which a wavelength of laser light for initialization (annealing) is 400 nm. Laser light L1 (wavelength: 400 nm) for annealing emitted from the laser light source 31 passes through the beam splitter 32, and is condensed by the objective lens 34 to form a laser spot S1. The initialization apparatus 30 uses the objective lens 34 with an NA of 0.85 corresponding to the thickness of the protective coating layer 15. Therefore, the laser spot S1 becomes smaller than that in the conventional example, and its diameter becomes about 240 nm. Light reflected from the laser spot S1 is detected by the focus detector 33 via the objective lens 34 and the beam splitter 32. The focus actuator 35 is driven based on the detected signal, and controls the laser spot S1 so that its diameter is not largely changed.

Initialization of the optical disk 10a is conducted by irradiating the lands 103 with the laser light L1 to anneal them. More specifically, the position of the laser light L1 is controlled by using, for example, a push-pull tracking control method so that the laser spot S1 scans the center of the lands 103. At this time, the laser spot S1 is moved at an appropriate linear velocity with respect to the recording/reproducing layer of the optical disk 10a by using a rotation drive mechanism (not shown) for moving the optical disk 10a and a mechanism (not shown) for moving the laser spot S1 in the radial direction of the optical disk. In the lands 103 irradiated with the laser light L1, the temperature of the first, second and third magnetic layers 21, 22 and 23 rises, and a magnetization state thereof becomes different from that of the periphery. As a result, magnetic coupling is cut off in the lands 103. Thus, by irradiating the lands 103 with the laser beam L1, the lands 103 are initialized. In the case where an emitted laser power of the laser light source 31 is 6 mW, the width of an annealed region (initialization region) in the lands 103 can be set to be about 0.2 μm or less at a linear velocity of 3 m/sec. This is caused by the following: a violet laser is used for initialization; an NA of the used objective lens 34 is larger than that described in the conventional example; the thickness of the second dielectric layer 14 is set so that the reflection of the laser light L1 is made small and the absorption amount of the laser light L1 is increased, and a light spot is radiated to the lands 103 in a convex shape, whereby light is absorbed by the convex portions, and a substantially narrow annealed width can be realized.

Embodiment 6

In Embodiment 6, another example of an optical disk of the present invention will be described. Regarding the same components as those described in the above-mentioned embodiments, a repeated description will be omitted here.

An optical disk of Embodiment 6 includes a substrate and a recording layer disposed above the substrate, and reproduces an information signal by the DWDD system, using light incident from the substrate side.

More specifically, in the same way as in the optical disk of Embodiment 1, the optical disk of Embodiment 6 includes a substrate 11, a recording layer 12 disposed above the substrate 11, a first dielectric layer 13 disposed between the substrate 11 and the recording layer 12, a second dielectric layer 14 disposed on the recording layer 12 opposite to the substrate 11, and a protective coating layer 15 disposed on the second dielectric layer 14.

In the optical disk of Embodiment 6, there is no limit to the thickness of the second dielectric layer. However, it is preferable to set the thickness of the second dielectric layer to be the same as that in Embodiment 1.

In the optical disk of Embodiment 6, sample servo pits for conducting tracking control by the sample servo system are formed on the substrate, and in the recording/reproducing region of the substrate, recording tracks are formed in a concentric shape or a spiral shape. In the optical disk of Embodiment 6, laser light used for recording/reproducing has a wavelength in a range of 600 nm to 650 nm, and the diameter of the laser spot is in a range of about 0.45 μm to about 0.60 μm. The track pitch of a recording track is in a range of 0.5 μm to 0.6 μm and is smaller than a diameter of a laser spot of laser light used for recording/reproducing. Furthermore, a recording track is cut off magnetically from an adjacent recording track by scanning of a laser spot with a wavelength shorter than that of laser light used for recording/reproducing. In the optical disk initialized by this method, the reflectivity $R_R$ of recording tracks with respect to laser light used for recording/reproducing and a reflectivity $R_M$ of a mirror portion (i.e., a region between two adjacent recording tracks) satisfy $0.95 < R_R/R_M \leq 1.0$.

As described above, in the optical disk and method for producing the same according to the present invention, the width of an annealed region between recording tracks can be made small, and the uniformity of the width of an annealed region can be enhanced. Therefore, according to the present invention, an optical disk with a high recording density, a high signal level, and a low noise can be obtained. Furthermore, the scanning speed during annealing can be increased, so that there are remarkable effects that initialization can be conducted in a short period of time, and productivity is remarkably enhanced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing an optical disk including a substrate and a recording layer disposed above the substrate and reproducing an information signal by a DWDD system, using light incident from the substrate side, the method comprising the processes of:
   (i) forming a first dielectric layer, the recording layer, and a second dielectric layer on the substrate in this order;
   (ii) irradiating the recording layer with laser light for initialization from the second dielectric layer side, thereby weakening magnetic coupling of a part of the recording layer;
   wherein a wavelength of the laser light for initialization is λ, and
   a thickness of the second dielectric layer is in a range of $\lambda/(12 \times n)$ to $\lambda/(2 \times n)$, where n is a refractive index of the second dielectric layer.

2. A method for producing an optical disk according to claim 1, wherein the laser light for initialization is obtained by condensing laser light by an objective lens with a numerical aperture of at least 0.65.

3. A method for producing an optical disk according to claim 1, wherein during the process (ii), the recording layer is irradiated with laser light for tracking servo, whereby tracking servo is conducted.

4. A method for producing an optical disk according to claim 1, further comprising forming, on the second dielectric layer, a heat conduction adjusting layer for adjusting sensitivity of the recording layer after the process (ii).

5. An optical disk comprising a substrate and a recording layer disposed above the substrate, and reproducing an information signal by a DWDD system, using light incident from the substrate side, the optical disk further comprising a first dielectric layer disposed between the substrate and the recording layer and a second dielectric layer disposed on the recording layer opposite to the substrate,
   wherein magnetic coupling of a part of the recording layer is weakened by irradiation with light having a wavelength λ incident from the second dielectric layer side, and
   a thickness of the second dielectric layer is in a range of $\lambda/(12 \times n)$ to $\lambda/(2 \times n)$, where n is a refractive index of the second dielectric layer.

6. An optical disk according to claim 5, wherein the second dielectric layer is made of silicon nitride and has a thickness in a range of 40 nm to 60 nm, and
   the wavelength λ is in a range of 400 nm to 410 nm.

7. An optical disk according to claim 5, wherein the second dielectric layer is made of silicon nitride and has a thickness in a range of 25 nm to 30 nm, and
   the wavelength λ is in a range of 400 nm to 440 nm.

8. An optical disk according to claim 5, wherein a refractive index of the second dielectric layer is larger than a refractive index of the first dielectric layer.

9. An optical disk according to claim 5, further comprising a heat conduction adjusting layer disposed on the second dielectric layer for adjusting sensitivity of the recording layer.

10. An optical disk according to claim 5, further comprising a protective coating layer formed on the second dielectric layer opposite to the substrate,
    the protective coating layer being thinner than the substrate.

11. An optical disk according to claim 5, wherein a difference in level is formed on a surface of the substrate on the recording layer side, and
    recording tracks of the recording layer are separated magnetically by the difference in level.

12. An optical disk comprising a substrate and a recording layer disposed above the substrate, and reproducing an information signal by a DWDD system, using light incident on the substrate side,
    wherein sample servo pits for conducting tacking control by a sample servo system are formed on the substrate,
    grooves to be recording tracks are formed in a concentric shape or a spiral shape in a recording/reproducing region of the substrate,
    a track pitch of the recording tracks is in a range of 0.5 μm to 0.6 μm, and
    the recording track is cut off magnetically from an adjacent recording track by allowing a laser spot of laser light having a wavelength λ in a range of 400 nm to 440 nm to scan an inter-groove portion.

* * * * *

UNITED STATES PATENT AND TRADEMARK OFFICE
CERTIFICATE OF CORRECTION

PATENT NO. : 6,975,564 B2  Page 1 of 1
APPLICATION NO. : 10/699937
DATED : December 13, 2005
INVENTOR(S) : Uchida et al.

It is certified that error appears in the above-identified patent and that said Letters Patent is hereby corrected as shown below:

Col. 16 line 49: "tacking" should read --tracking--

Signed and Sealed this

Eighth Day of August, 2006

JON W. DUDAS
*Director of the United States Patent and Trademark Office*